United States Patent [19]

Kondo et al.

[11] Patent Number: 4,861,625
[45] Date of Patent: Aug. 29, 1989

[54] METHOD OF MANUFACTURING A THERMAL PRINTING HEAD HAVING A PARTIALLY-GLAZED CERAMIC SUBSTRATE

[75] Inventors: Kazuo Kondo; Tatsunori Kurachi, both of Aichi, Japan

[73] Assignee: NGB Spark Plug co., Ltd., Aichi, Japan

[21] Appl. No.: 942,962

[22] Filed: Dec. 16, 1986

Related U.S. Application Data

[63] Continuation of Ser. No. 814,054, Dec. 27, 1985, abandoned.

[30] Foreign Application Priority Data

Dec. 27, 1984 [JP] Japan .................................. 59-275749

[51] Int. Cl.⁴ .............................................. B05D 5/12
[52] U.S. Cl. ................................... 427/126.2; 29/611; 29/620; 427/279; 427/299; 427/330; 427/376.2; 427/376.4; 427/376.5
[58] Field of Search ............... 427/376.2, 376.4, 376.5, 427/299, 330, 126.2, 279; 29/611, 620

[56] References Cited

U.S. PATENT DOCUMENTS

| 2,182,132 | 12/1939 | Matthes | 427/376.5 |
| 2,581,310 | 1/1952 | Swto | 427/376.5 |
| 2,695,249 | 11/1954 | Swto et al. | 427/376.5 |
| 2,872,352 | 2/1959 | Porter et al. | 427/376.5 |
| 3,982,048 | 9/1976 | Zlupko | 427/376.2 |
| 4,004,052 | 1/1977 | Bystrova et al. | 427/376.2 |
| 4,241,103 | 12/1980 | Ohkubo et al. | 29/611 |

FOREIGN PATENT DOCUMENTS

| 57-43987 | 3/1982 | Japan | 427/376.5 |
| 1000073 | 2/1964 | United Kingdom | 427/376.2 |

*Primary Examiner*—Norman Morgenstern
*Assistant Examiner*—Sadie Childs
*Attorney, Agent, or Firm*—Finnegan, Henderson, Farabow, Garrett & Dunner

[57] ABSTRACT

A method of manufacturing a partially-glazed ceramic substrate for use in a thermal printing head. A ceramic substrate having a surface roughness of 0.2 μm or less is provided. Subsequently, a glaze is applied to the ceramic substrate to form raised glaze regions having a transverse width of 1.0 mm or less and thickness of 100 μm or less. The substrate and lgaze are baked, and then a heating element is formed on the raised glaze regions.

6 Claims, 1 Drawing Sheet

METHOD OF MANUFACTURING A THERMAL PRINTING HEAD HAVING A PARTIALLY-GLAZED CERAMIC SUBSTRATE

This application is a continuation of application Ser. No. 814,054, filed Dec. 27, 1985 now abandoned.

FIELD OF THE INVENTION

The present invention relates to a method of manufacturing a partially-glazed substrate for use in facsimile systems, printer heads and telex terminals.

BACKGROUND OF THE INVENTION

As is well known, a conventional substrate for use in facsimile systems, printer heads and the like, as shown in FIG. 2, was produced in such a manner that a glaze layer 22 is applied over the whole surface of a ceramic substrate 21 made of alumina or the like. A heating resistance element 23 and electrodes 24 are thereafter printed thereon, and a wear-proof protective layer 25 is formed on the surface. In such a conventional structure, there is no or little difference in levels between the heating resistance element and parts other than the heating resistance element and therefore, it is required to apply pressure to the printing paper when using a substrate of this type. It is necessary to make the pressure considerably large which greatly limits the degree of miniaturization of such systems.

To avoid the above disadvantage, there has been developed a partially-glazed substrate that is manufactured as shown in FIG. 1. A glaze layer 12 is formed as a projection on a ceramic substrate 11 only at a part of the surface thereof which will be the location of a heating resistance element 13. The heating resistance element 13 and electrodes 14 are printed on the top and sides of the glaze layer 12 and a protective layer 15 is formed thereon. As a result, there is a difference in the level of the heating resistance element 13 and the other part. However, in the case where the partially-glazed substrate had a glaze layer having a portion 1.0 mm or less in width in the transvers direction, a vertically upward rising 12a of glaze was often produced at a longitudinal end portion of the glaze layer as shown in FIG. 3, severely limiting the use of the substrate.

The present inventors have developed a partially-glazed substrate having a glaze layer with a rated thickness of 40–60 μm and a surface tension of 250 dyne/cm or more. In this manner, the glaze can be well-formed without producing any irregularity such as the rising shown in FIG. 3 even in a glaze layer having a width of 1.0 mm or less in the transverse direction. That invention has been disclosed in Unexamined Japanese Patent Publication No. 59-156979.

In order to obtain a predetermined difference in level between the heating resistance element 13 and each of the other parts of the substrate which is required in a hyperspeed facsimile, i.e., one capable of transmitting an A4 page in 2–3 sec., it is necessary to make the rated thickness of the glaze 60–80 μm. The invention disclosed in Unexamined Japanese Patent Publication No. 59-156979, however, is unsatisfactory for forming a glaze layer having a width of 1.0 mm or less and a thickness of 60–80 μm.

OBJECTS AND SUMMARY OF THE INVENTION

An object of the present invention is the formation on a substrate of a glaze layer having a width of 1.0 mm or less and a thickness of 60–80 μm.

Another object of the present invention is the formation of a glaze layer for use in a hyperspeed facsimile machine.

A further object of the present invention is the formation of a glaze layer that does not have a raised portion on the edges thereof.

These and other objects are accomplished by a method of manufacturing a partially glazed substrate comprising the steps of providing a substrate having a surface roughness of 0.2 μm or less, applying to the substrate a glaze layer having a predetermined width and thickness; and baking the substrate and glaze layer.

BRIEF DESCRIPTION OF THE DRAWINGS

The manner by which the above objects and other objects, features, and advantages of the present invention are attained will become more apparent from the following detailed description when considered in view of the drawings, wherein.

DETAILED DESCRIPTION

Figure 1:
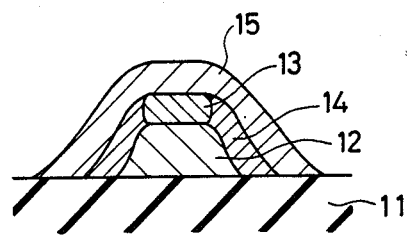
FIG. 1 is a transverse cross-section of a conventional partially-glazed substrate.
Figure 2:
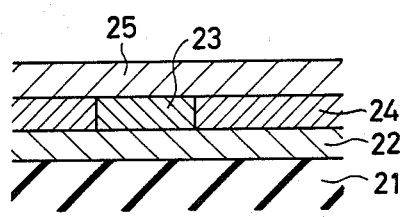
FIG. 2 is a transverse cross-section of an entirely-glazed substrate.
Figure 3:
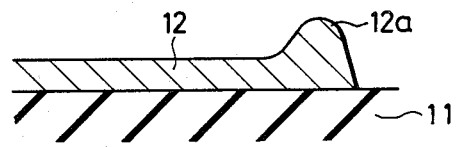
FIG. 3 is a longitudinal cross-section of a partially-glazed substrate according to a conventional manufacturing method.

The method of manufacturing a partially-glazed substrate according to the present invention includes the steps of providing a substrate, e.g., a ceramic substrate, having a surface roughness of 0.2 μm or less, applying a glaze layer having a transverse width of 1.0 mm or less and a predetermined thickness, and baking the glazed substrate to suppress wetness of the glaze.

Glazes made of the materials shown in the following Table were thick-films printed on a ceramic substrate to form glaze layers having a transverse width of 0.45 mm, a length of 20 mm, and a thickness of 100 μm. The substrate was made of alumina and had a width and length of 50 mm and a thickness of 0.7 mm. The surface roughness of the substrates were as shown in the Table. The partially-glazed substrates were baked under the conditions shown in the Table and the thickness, width, and rising height of the glaze layers after baking were measured and the measured results were written in the Table. The measurement of thickness of the glaze layers was made by using Surfcom III type, produced by TOKYO SEIMITSU Co., Ltd.

TABLE

| Surface roughness of substrate(μm) | Materials for glaze | Condition of baking | Surface tension (dyne/cm) | Glaze Layer after baking | | | Remarks |
| --- | --- | --- | --- | --- | --- | --- | --- |
| | | | | Thickness (μm) | Width (mm) | Rising (μm) | |
| 0.09 | SiO—SrO—$B_2O_3$—CuO group | 1200° C. 1 Hour | 280 | 72 | 0.47 | 0 | The invention |
| 0.09 | SiO—CaO—$B_2O_3$ group | 1230° C. 1 Hour | 330 | 75 | 0.51 | 0 | " |

TABLE-continued

| Surface roughness of substrate(μm) | Materials for glaze | Condition of baking | Surface tension (dyne/cm) | Glaze Layer after baking | | | Remarks |
| --- | --- | --- | --- | --- | --- | --- | --- |
| | | | | Thickness (μm) | Width (mm) | Rising (μm) | |
| 0.09 | SiO—PbO—$B_2O_3$—$Na_2O$ group | 1100° C. 1 Hour | 230 | 47 | 0.87 | 7 | Comparative example |
| 0.30 | SiO—PbO—$B_2O_3$—$Na_2O$ group | 1100° C. 1 Hour | 230 | 29 | 1.10 | 5 | '' |
| 0.30 | SiO—SrO—$B_2O_3$—CaO group | 1200° C. 1 Hour | 280 | 52 | 0.59 | 0 | '' |
| 0.30 | SiO—CaO—$B_2O_3$ group | 1230° C. 1 Hour | 330 | 55 | 0.65 | 0 | '' |
| | Desired values | | | 60–80 | $\leq 1.0$ | 0 | — |

According to the method of manufacturing a partially-glazed substrate of the present invention, as described above, it is possible to manufacture the foregoing partially-glazed substrates for use in hyperspeed facsimile machine without causing irregularity in the glaze layer, and particularly, without causing an irregularity at a longitudinal end portion of the glaze layer.

The fact that the surface roughness of the partially-glazed substrate according to the invention is 0.2 μm or less is effective to prevent wires from being broken in the situation having a tendency of fractionalization in recent years with respect to wiring patterns formed on a non-glazed surface portion.

What is claimed is:

1. A method of manufacturing a partially-glazed ceramic substrate for use in a thermal printing head, said method comprising the steps of:
   providing a ceramic substrate having a surface roughness of 0.2 μm or less;
   applying a glaze to said substrate to form raised glaze regions having a transverse width of 1.0 mm or less and a thickness in the range from greater than 60 μm to approximately 100 μm, said glaze having a surface tension of at least 250 dyne/cm;
   baking the substrate and glaze; and
   forming a heating element on said raised glaze regions.

2. A method according to claim 1, wherein said step of baking includes the step of heating the glazed substrate to a temperature of 1100° C. to 1230° C. for one hour.

3. A method according to claim 2, wherein said glaze maintains at least 250 dyne/cm during said baking step.

4. A method according to claim 1, further comprising the step of applying a protective layer to said heating element.

5. A method according to claim 1 wherein said raised glaze regions have a thickness in the range from greater than 60 μm to 80 μm.

6. A method according to claim 1, wherein said raised glaze regions have a thickness of approximately 100 μm.

* * * * *